United States Patent
Chen et al.

(10) Patent No.: US 10,277,697 B2
(45) Date of Patent: Apr. 30, 2019

(54) METHOD AND SYSTEM FOR PUSHING WEB APPLICATION MESSAGE

(71) Applicant: Tencent Technology (Shenzhen) Company Limited, Shenzhen (CN)

(72) Inventors: Ping Chen, Shenzhen (CN); Shuning Tian, Shenzhen (CN); Shudong Ruan, Shenzhen (CN); Kai Zhang, Shenzhen (CN); Shiqing Fan, Shenzhen (CN); Sha Mo, Shenzhen (CN); Li Xia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 425 days.

(21) Appl. No.: 15/153,096

(22) Filed: May 12, 2016

(65) Prior Publication Data
US 2016/0337462 A1 Nov. 17, 2016

Related U.S. Application Data

(63) Continuation of application No. PCT/CN2015/070213, filed on Jan. 6, 2015.

(30) Foreign Application Priority Data

Jan. 6, 2014 (CN) .......................... 2014 1 0005658

(51) Int. Cl.
*H04L 29/06* (2006.01)
*H04L 29/08* (2006.01)

(52) U.S. Cl.
CPC .......... *H04L 67/26* (2013.01); *H04L 65/1063* (2013.01); *H04L 67/02* (2013.01); *H04L 67/36* (2013.01); *H04L 67/42* (2013.01)

(58) Field of Classification Search
CPC .................................................. H04L 65/1063
See application file for complete search history.

(56) References Cited

U.S. PATENT DOCUMENTS

| | | | |
|---|---|---|---|
| 6,035,336 A | 3/2000 | Lu | |
| 2011/0289172 A1* | 11/2011 | Marcellino | H04L 51/24 709/206 |

FOREIGN PATENT DOCUMENTS

| | | |
|---|---|---|
| CN | 102158746 A | 8/2011 |
| CN | 102316423 A | 1/2012 |

(Continued)

OTHER PUBLICATIONS

International Search Report for corresponding application PCT/CN2015/070213 filed on Jan. 6, 2015; dated Apr. 13, 2015.

*Primary Examiner* — Suraj M Joshi
(74) *Attorney, Agent, or Firm* — Cantor Colburn LLP (57) ABSTRACT

A method for pushing a web application message may include: receiving, by a push server, token information and message information sent by an application server, parsing the token information to obtain a client identifier and an application identifier, acquiring a corresponding client according to the client identifier, and pushing the message information and the application identifier to the client; and acquiring, by the client, a corresponding web application according to the application identifier, and displaying the message information according to the web application. In addition, a system for pushing a web application message is further provided. The foregoing method and system for pushing a web application message can improve the development efficiency.

19 Claims, 8 Drawing Sheets

(56) References Cited

FOREIGN PATENT DOCUMENTS

| CN | 103037312 A | 4/2013 |
|---|---|---|
| CN | 103327043 A | 9/2013 |

\* cited by examiner

METHOD AND SYSTEM FOR PUSHING WEB APPLICATION MESSAGE

CROSS REFERENCE TO RELATED APPLICATIONS

This application is a continuation of International Patent Application No. PCT/CN2015/070213 filed on Jan. 6, 2015 which claims priority to Chinese Patent Application No. 201410005658.1 filed on Jan. 6, 2014, all of which said applications are herein incorporated by reference in their entirety.

TECHNICAL FIELD

The present disclosure relates to the field of Internet technologies, and in particular, to a method and a system for pushing a web application message.

BACKGROUND

In some scenarios, methods for pushing a web application message are generally implemented inside web applications. Generally, developers of different web applications design corresponding pushing code according to respective requirements. As a result, reuse rate of the code is not high, leading to low development efficiency.

SUMMARY

Based on the above, it is necessary to provide a method for pushing a web application message, where the method can improve the development efficiency. A method for pushing a web application message includes:

receiving, by a push server, token information and message information sent by an application server, parsing the token information to obtain a client identifier and an application identifier, acquiring a corresponding client according to the client identifier, and pushing the message information and the application identifier to the client; and acquiring, by the client, a corresponding web application according to the application identifier, and displaying the message information according to the web application.

In addition, it is further necessary to provide a system for pushing a web application message, where the system can improve the development efficiency.

A system for pushing a web application message includes a push server and a client, where:

the push server is configured to receive token information and message information sent by an application server, parse the token information to obtain a client identifier and an application identifier, acquire a corresponding client according to the client identifier, and push the message information and the application identifier to the client; and the client is configured to acquire a corresponding web application according to the application identifier, and display the message information according to the web application.

In addition, it is further necessary to provide a method for pushing message information of a web application to a browser, where the method can improve the development efficiency.

A method for pushing message information of a web application to a browser includes:

receiving token information and message information sent by an application server;

parsing the token information to obtain a client identifier and an application identifier, and acquiring a corresponding client according to the client identifier; and pushing the message information and the application identifier to the client.

In addition, it is further necessary to provide an apparatus for pushing message information of a web application to a browser, where the apparatus can improve the development efficiency.

An apparatus for pushing message information of a web application to a browser includes:

a message receiving module, configured to receive token information and message information sent by an application server;

a client acquiring module, configured to parse the token information to obtain a client identifier and an application identifier, and acquire a corresponding client according to the client identifier; and a message pushing module, configured to push the message information and the application identifier to the client.

In addition, it is further necessary to provide a method for generating token information of a web application, where the method can improve the development efficiency.

A method for generating token information of a web application includes:

acquiring a client identifier, an application identifier of a web application, and a user identifier corresponding to the web application;

uploading the client identifier, the application identifier, and the user identifier to the push server, and receiving returned token information, where the token information is generated by the push server through encryption according to the uploaded client identifier, application identifier, and user identifier; and uploading the token information and the user identifier to the application server by using the web application.

In addition, it is further necessary to provide an apparatus for generating token information of a web application, where the apparatus can improve the development efficiency.

An apparatus for generating token information of a web application includes:

an identifier acquiring module, configured to acquire a client identifier, an application identifier of a web application, and a user identifier corresponding to the web application;

a token acquiring module, configured to upload the client identifier, the application identifier, and the user identifier to the push server, and receive returned token information, where the token information is generated by the push server through encryption according to the uploaded client identifier, application identifier, and user identifier; and a token uploading module, configured to upload the token information and the user identifier to the application server by using the web application.

In the foregoing method and system for pushing a web application message, method and apparatus for pushing message information of a web application to a browser, and method and apparatus for generating token information of a web application, an application server of a web application only needs to send message information and token information to a push server to push the message information, through the push server, to a client corresponding to the token information, so that developers of the web application only need to implement a simple message sending function to complete pushing of the message information, thereby improving the development efficiency.

BRIEF DESCRIPTION OF THE DRAWINGS

In order to illustrate technical solutions according to embodiments of the present disclosure, the drawings to be used in the descriptions of the embodiments of the disclosure will be described briefly hereinafter. The drawings described hereinafter include only some embodiments related to the present disclosure. Other drawings may be determined by those skilled in the art based on those drawings without any creative effort.

DESCRIPTION OF EMBODIMENTS

Figure 1:
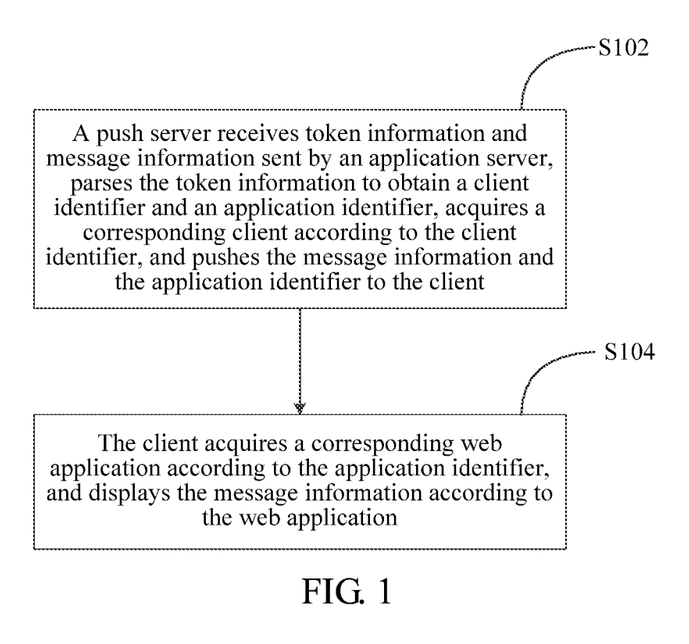
FIG. 1 is a flowchart of a method for pushing a web application message in an embodiment.
Figure 2:
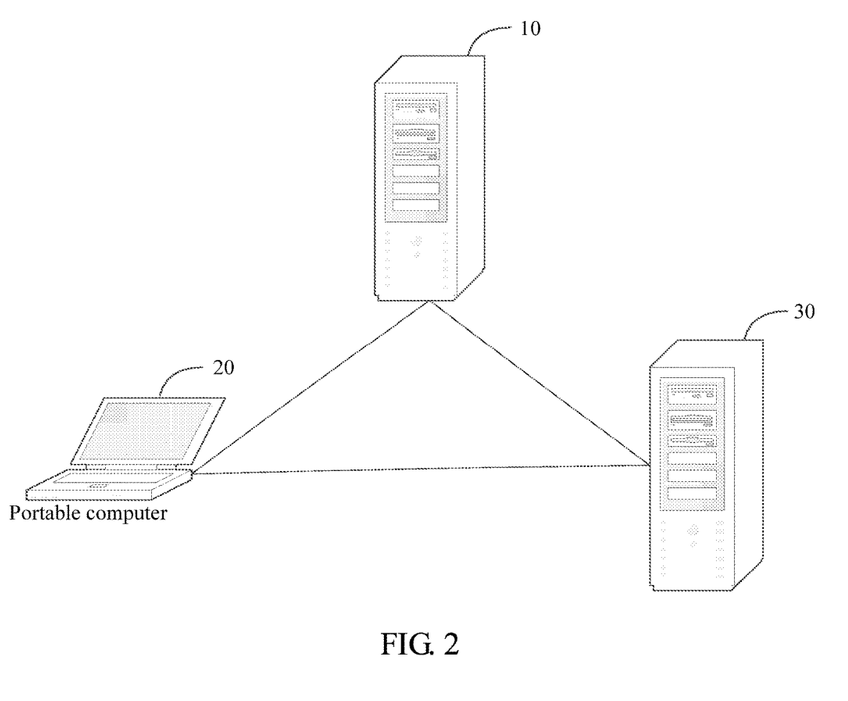
FIG. 2 is a schematic structural diagram of a system for pushing a web application message in an embodiment.

In an embodiment, as shown in FIG. 1, a method for pushing a web application message is provided, and the method completely relies on a computer program, and may run in a computer system based on the von Neumann architecture. As shown in FIG. 2, the computer system may include a push server 10, a client 20, and an application server 30.

The client 20 may be a computer device such as a personal computer in which a browser is installed, a notebook computer, a tablet computer, a smart phone, or a palm computer, and the application server 30 may be a server of a web application, where the web application is an application using a browser as a running platform.

In this embodiment, the method includes:

Step S102: A push server receives token information and message information sent by an application server, parses the token information to obtain a client identifier and an application identifier, acquires a corresponding client according to the client identifier, and pushes the message information and the application identifier to the client.

Step S104: The client acquires a corresponding web application according to the application identifier, and displays the message information according to the web application.

The client identifier is an identifier of a browser installed on a client by a user (because the client identifier is corresponding to the browser, the client identifier may also be referred to as a browser identifier). The user may use the client identifier on the client to log on to the push server after starting a browser application, and the push server may establish a correspondence between the client identifier and a network address of the client. In another embodiment, the client may also directly use an IP address of the client as the client identifier and upload the IP address to the push server, and the push server may communicate with the client according to the IP address.

It should be noted that, if the user logs out of the browser on a client A and uses the client identifier on a client B to log in again, a network address corresponding to the client identifier stored on the push server changes from a network address of the client A to a network address of the client B.

The application identifier is an identifier of a web application that uses a browser as a running platform. The application identifier is globally unique, and may be used to distinguish different web applications.

Figure 3:
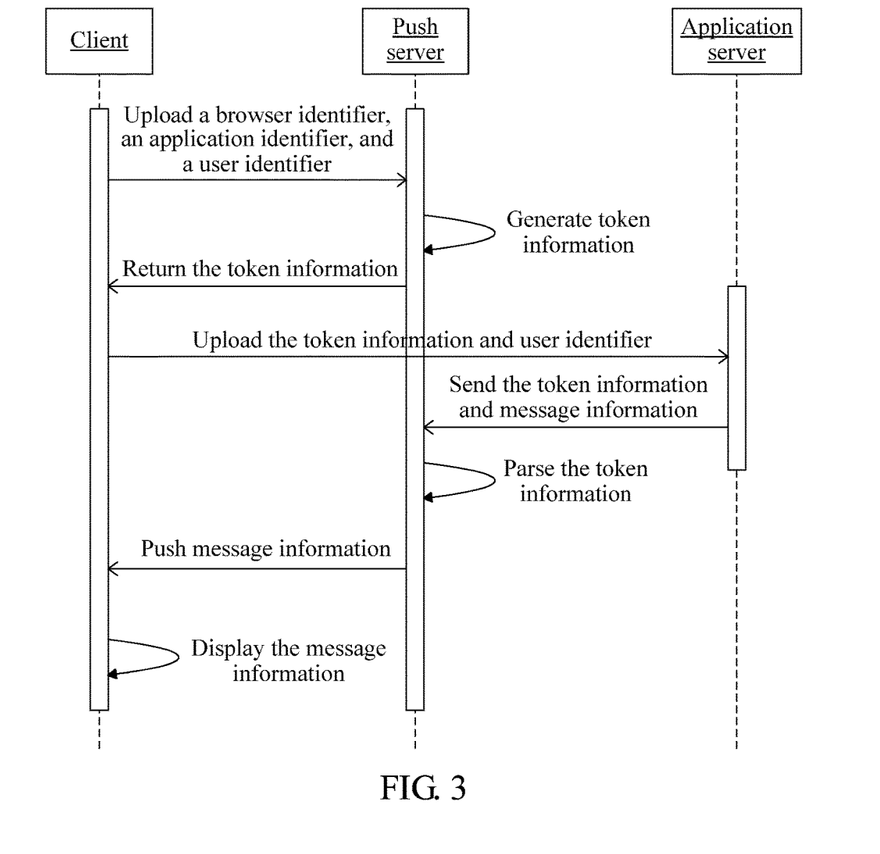
FIG. 3 is an interaction sequence diagram of a method for pushing a web application message in an embodiment.

In this embodiment, also referring to FIG. 3, the token information is generated by the push server and uploaded by the client to the application server in advance, and the process is described as follows:

The client acquires a client identifier, an application identifier of a web application, and a user identifier corresponding to the web application, uploads the client identifier, the application identifier, and the user identifier to a push server, receives returned token information, and uploads the token information and the user identifier to the application server by using the web application. The returned token information is generated by the push server through encryption according to the uploaded client identifier, application identifier and user identifier.

The user identifier is an account used when a user runs a web application, and may include an account registered by the user on the web application, an anonymous user account (Anonymous user) or a demo account (test account or guest account).

In this embodiment, the client acquires a user identifier entry event of the web application, acquires a user identifier corresponding to the user identifier entry event, and acquires the client identifier and the application identifier of the web application by using a browser background process.

The user identifier entry event is an event triggered when the user inputs a user identifier on the web application, for example, the user identifier entry event may be triggered when the user registers and logs in to the web application or switches accounts on the web application.

In this embodiment, a user identifier and a web application address that are correspondingly input may be extracted from the user identifier entry event, then the user identifier and the web application address are used as parameters, and an interface function of a preset browser background process is called. The interface function may be based on a script language such as javascript, and is pre-written by a browser developer and is notified to a third-party developer of the web application by using a development document.

When designing the web application, the third-party developer may call the interface function in an event response function of the user identifier entry event, and use the correspondingly input user identifier and web application address that are extracted from the user identifier entry event as parameters to be transmitted to the interface function. After the interface function is called, the client identifier input when the user logs in to the browser may be acquired by using the browser background process, and the application identifier corresponding to the web application address is acquired according to the web application address (where the application identifier may be obtained by means of domain name matching).

Further, the client may upload the client identifier, the application identifier, and the user identifier to the push server by calling an interface function of a browser background process.

Further, the client receives the returned token information by using the browser background process, and uses the token information as a callback value of the interface function and returns the callback value to the web application.

As in the foregoing example, after the interface function of the browser background process is called when the input user identifier and web application address are received as input parameters, the client identifier and the application identifier are acquired first, and then the user identifier, the client identifier, and the application identifier are uploaded to the push server, where a return value of the interface function is the token information returned by the push server. After the callback value (the token information) of the interface function is returned, the token information and the user identifier may be uploaded to an application server corresponding to the web application. The application server may store the uploaded user identifier and token information in a form of a key-value pair.

In this embodiment, also referring to FIG. 3, the token information and the message information are sent to the push server by the application server after the application server receives the message push instruction, and the process is as follows:

receiving, by the application server, a message push instruction, acquiring a user identifier corresponding to the message push instruction, and corresponding message information, acquiring token information corresponding to the user identifier, and sending the token information and the message information to the push server.

The message push instruction may be automatically generated by the application server, or may also be triggered by a user by operating a web application on a browser of the client. For example, if a scheduled task to be pushed regularly is set on the application server, the application server may generate a message push instruction when a timer expires. The user may also manually click a news push button on the web application to trigger the message push instruction.

After receiving the message push instruction, the application server may perform search according to the stored key-value pair, to acquire token information and message information that are corresponding to the user identifier (namely, message content that needs to be pushed to a client in which the user resides).

The push server may open a fixed domain name and port, and listen on the port by using a daemon. The application server of the web application may send data to the push server according to the domain name and port. The daemon of the push server may receive the data.

For example, if a user A sets, on a web application of a news type, a timer function for regularly pushing news, when the timer function expires, the web application searches for a user preference corresponding to the user A, acquires corresponding news as message information, searches for corresponding token information in key-value pairs according to an account of the user A, and then sends the news and the token information to the push server.

In this embodiment, after receiving the message information and the token information sent by the application server, the push server may push the message information and the application identifier to the client by using a browser long connection; and the client may receive the message information and the application identifier by using a browser background process.

As above, the user may establish, on the client, a long connection to the push server by logging in to a browser, and may maintain the long connection by sending a heartbeat packet. Because the connection is created by the browser background process, the connection is a statefull connection. The push server may find the connection according to the client identifier used for login, thereby pushing the message information and the application identifier to the client by using the long connection.

In this embodiment, the push server may further be configured to acquire an online state of the client, and determine, according to the online state, whether the client is online, and if yes, push the message information and the application identifier to the client. Preferably, the push server acquires a connection state of a browser long connection to the client as the online state.

That is, the push server may acquire, according to the client identifier input when the user logs in to a browser on a client, a connection state of a long connection corresponding to the client, and if the connection is being maintained, it indicates that the browser is in a running state on the client, that is, online, the push server may push the message information and the application identifier to the client by using the long connection, so that the client may find, in the browser, a web application corresponding to the application identifier, and then transmit the message information to the web application, so that the browser may display the message information on the web application.

Further, if determining that the client is offline (not online), the push server may store the message information and the token information into the cache.

The push server may further receive a long connection request, establish a browser long connection to a client corresponding to the long connection request, and receive an uploaded user identifier by using the browser long connection. The push server may further acquire, from the cache, token information corresponding to the user identifier, acquire message information corresponding to the token information, and push the message information to the client.

That is, if the push server finds that the long connection to the client is disconnected, the user may already exit a browser application or may be in a network disconnection state, and the message information is cached. After the user restarts the browser application on the client, and uses a same client identifier to log in to the push server (that is, initiating a long connection request to the push server), the push server may retrieve the cached message information and token information from the cache, and then push the message information and the token information to the client.

It should be noted that, in this application scenario, the client corresponding to the client identifier when the push server receives the message information may be different the client corresponding to the client identifier when the message information is retrieved from the cache. For example, if the user logs in to the browser application on a client A, after the browser application runs for a period of time, the network connection is disconnected, and in this case, the client corresponding to the client identifier is still the client A; and if the user logs in to the browser application again on a client B, after the push server establishes a long connection to the client B, the client identifier is corresponding the client B. That is, even though the user switches the client, the user still can receive the pushed message information.

In this embodiment, the push server may parse the token information to obtain a user identifier, and determine, by checking the user identifier, whether the token information is valid, and if yes, acquire a corresponding client according to the client identifier.

The push server may compare the user identifier obtained by parsing the token information with a user identifier which is uploaded by the client and received when the token information is generated (where the user identifier and the generated token information may be cached on the push server in a form of a key-value pair), and if they are the same, the check is successful; otherwise, the check fails. If the check fails, the message information is an error message, and may be discarded.

In this embodiment, the push server may further acquire a type value contained in the message information, and determine whether the type value is legal, and if yes, push the message information and the application identifier to the client.

Figure 4:
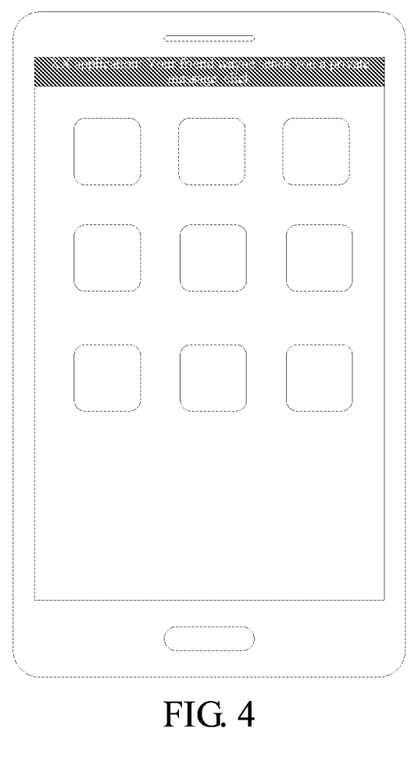
FIG. 4 is a schematic diagram of an interface on which a client displays a taskbar message in an embodiment.
Figure 5:
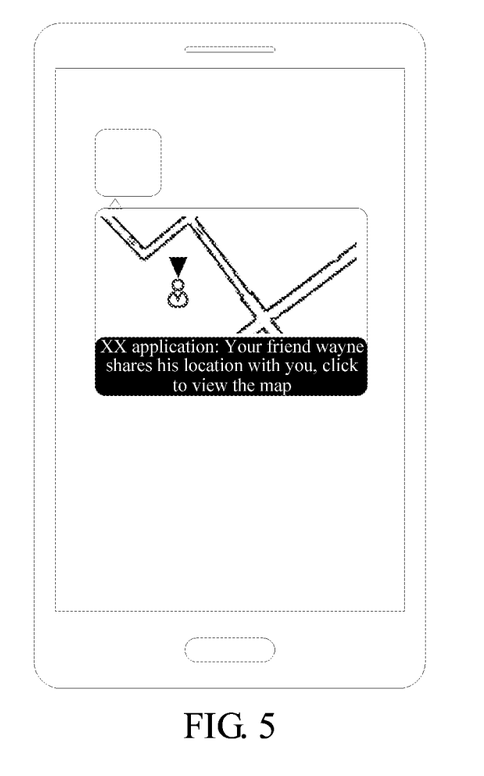
FIG. 5 is a schematic diagram of an interface on which a client displays a pop-up message in an embodiment.
Figure 6:
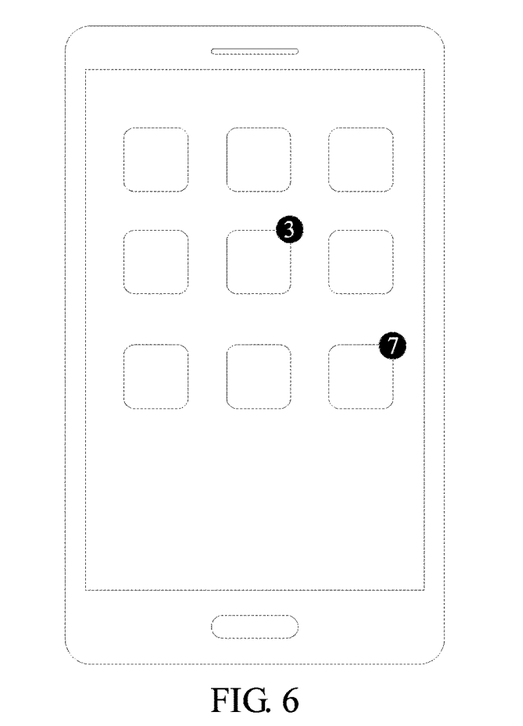
FIG. 6 is a schematic diagram of an interface on which a client displays a dock message in an embodiment.

The type value contained in the message information is the type of a pushed message information, and may include a taskbar message, a pop-up message, a dock (which is a function interface, in the interface, used to start and switch a running application program) message, or the like. As shown in FIG. 4, FIG. 5 and FIG. 6, interfaces of a taskbar message, a pop-up message, and a dock message are displayed respectively.

The push server may acquire parameter information of the client by using the long connection to the client, and determine, according to the parameter information, whether the type value is legal. For example, if the client is an android or ios system, the client supports a taskbar message, and the taskbar message type is legal; and if the client is a windows operating system, the client does not support the taskbar message, and the taskbar message type is illegal.

In an embodiment, as shown in FIG. 2, a system for pushing a web application message includes a push server 10 and a client 20, where:

the push server 10 is configured to receive token information and message information sent by an application server 30, parse the token information to obtain a client identifier and an application identifier, acquire a corresponding client 20 according to the client identifier, and push the message information and the application identifier to the client 20; and the client 20 is configured to acquire a corresponding web application according to the application identifier, and display the message information according to the web application.

In this embodiment, the client 20 is further configured to acquire a client identifier, an application identifier of a web application, and a user identifier corresponding to the web application, upload the client identifier, the application identifier, and the user identifier to the push server 10, receive returned token information, and upload the token information and the user identifier to the application server 30 by using the web application, where the returned token information is generated by the push server 10 through encryption according to the uploaded client identifier, application identifier, and user identifier.

In this embodiment, the client 20 is further configured to upload the client identifier, the application identifier, and the user identifier to the push server by calling an interface function of a browser background process.

In this embodiment, the client 20 is further configured to receive the returned token information by using the browser background process, and use the returned token information as a callback value of the interface function and return the token information to the web application.

In this embodiment, the client 20 is further configured to acquire a user identifier entry event of the web application, acquire a user identifier corresponding to the user identifier entry event, and acquire the client identifier and the application identifier of the web application by using a browser background process.

In this embodiment, the push server 10 is further configured to push the message information and the application identifier to the client by using a browser long connection.

The client 20 is further configured to receive the message information and the application identifier by using a browser background process.

In this embodiment, the push server 10 is further configured to acquire an online state of the client 20, and determine, according to the online state, whether the client is online, and if yes, push the message information and the application identifier to the client 20.

In this embodiment, the push server 10 is further configured to acquire a connection state of a browser long connection to the client as the online state.

In this embodiment, the push server 10 is further configured to: when the client is not online, store the message information and the token information into a cache.

The push server 10 is further configured to receive a long connection request, and establish a browser long connection to a client corresponding the long connection request, and receive an uploaded user identifier by using the browser long connection; and acquire, from the cache, token information corresponding to the user identifier, acquire message information corresponding to the token information, and push the message information to the client.

In this embodiment, the push server 10 is further configured to parse the token information to obtain a user identifier, and determine, by checking the user identifier, whether the token information is valid, and if yes, acquire a corresponding client according to the client identifier.

In this embodiment, the push server 10 is further configured to acquire a type value contained in the message information, and determine whether the type value is legal, and if yes, push the message information and the application identifier to the client.

In this embodiment, the application server 30 is further configured to receive a message push instruction, acquire a user identifier corresponding to the message push instruction, and corresponding message information, acquire token information corresponding to the user identifier, and send the token information and the message information to the push server.

Figure 7:
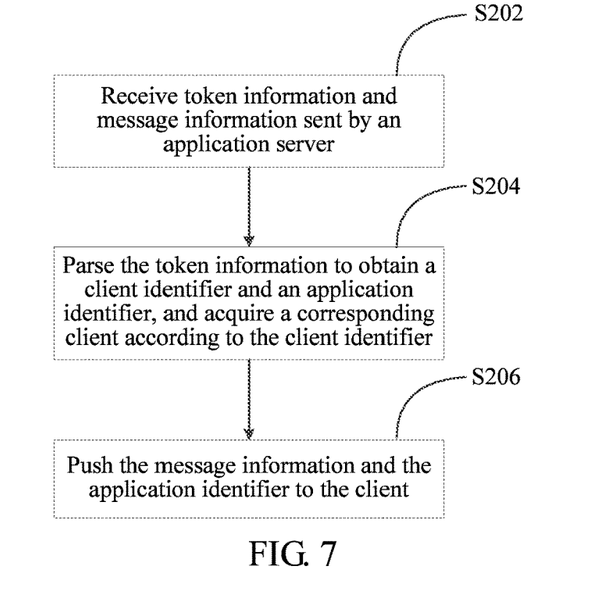
FIG. 7 is a flowchart of a method for pushing message information of a web application to a browser in an embodiment.

In an embodiment, as shown in FIG. 7, a method for pushing message information of a web application to a browser is provided, and the method completely relies on a computer program, and may run in a computer system based on the von Neumann architecture. The method includes:

Step S202: Receive token information and message information sent by an application server.

Step S204: Parse the token information to obtain a client identifier and an application identifier, and acquire a corresponding client according to the client identifier.

Step S206: Push the message information and the application identifier to the client.

In this embodiment, the step of the pushing the message information and the application identifier to the client includes:

pushing the message information and the application identifier to the client by using a browser long connection.

In this embodiment, the step of the acquiring a corresponding client according to the client identifier further includes:

acquiring an online state corresponding to the client identifier, and determining, according to the online state, whether the client is online, and if yes, pushing the message information and the application identifier to the client.

In this embodiment, the step of the acquiring an online state corresponding to the client identifier is:

acquiring a connection state of a browser long connection to the client as the online state.

In this embodiment, after the step of determining whether the client is online, the method further includes:

if the client is not online, storing the message information and the token information into a cache, where the method further includes:

receiving a long connection request, establishing a browser long connection to a client corresponding to the long connection request, and receiving an uploaded user identifier by using the browser long connection; and acquiring, from the cache, token information corresponding to the user identifier, acquiring message information corresponding to the token information, and pushing the message information to the client.

In this embodiment, the step of the parsing token information further includes:

parsing the token information to obtain a user identifier, and determining, by checking the user identifier, whether the token information is valid, and if yes, acquiring a corresponding client according to the client identifier.

In this embodiment, before the step of the pushing the message information and the application identifier to the client, the method further includes:

acquiring a type value contained in the message information, and determining whether the type value is legal, and if yes, pushing the message information and the application identifier to the client.

Figure 8:
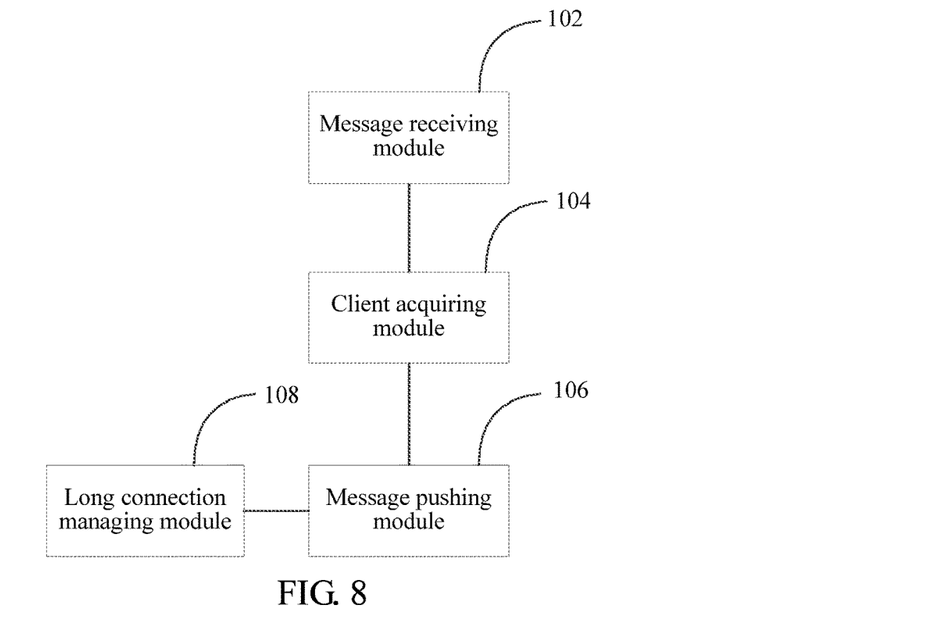
FIG. 8 is a schematic structural diagram of a system for pushing message information of a web application to a browser in an embodiment.

In an embodiment, as shown in FIG. 8, an apparatus for pushing message information of a web application to a browser includes:

a message receiving module 102, configured to receive token information and message information sent by an application server;

a client acquiring module 104, configured to parse the token information to obtain a client identifier and an application identifier, and acquire a corresponding client according to the client identifier; and a message pushing module 106, configured to push the message information and the application identifier to the client.

In this embodiment, the message pushing module 106 is further configured to push the message information and the application identifier to the client by using a browser long connection.

In this embodiment, the client acquiring module 104 is further configured to acquire an online state corresponding to the client identifier, determine, according to the online state, whether the client is online, and if yes, call the message pushing module to push the message information and the application identifier to the client.

In this embodiment, the client acquiring module 104 is further configured to acquire a connection state of a browser long connection to the client as the online state.

In this embodiment, the client acquiring module 104 is further configured to: when the client is not online, store the message information and the token information into a cache.

As shown in FIG. 8, the apparatus further includes a long connection managing module 108, configured to receive a long connection request, and establish a browser long connection to a client corresponding to the long connection request, and receive an uploaded user identifier by using the browser long connection; and the message pushing module 106 is further configured to acquire, from the cache, token information corresponding to the user identifier, acquire message information corresponding to the token information, and push the message information to the client.

In this embodiment, the client acquiring module 104 is further configured to parse the token information to obtain a user identifier, and determine, by checking the user identifier, whether the token information is valid, and if yes, acquire a corresponding client according to the client identifier.

In this embodiment, the client acquiring module 104 is further configured to acquire a type value contained in the message information, and determine whether the type value is legal, and if yes, push the message information and the application identifier to the client.

Figure 9:
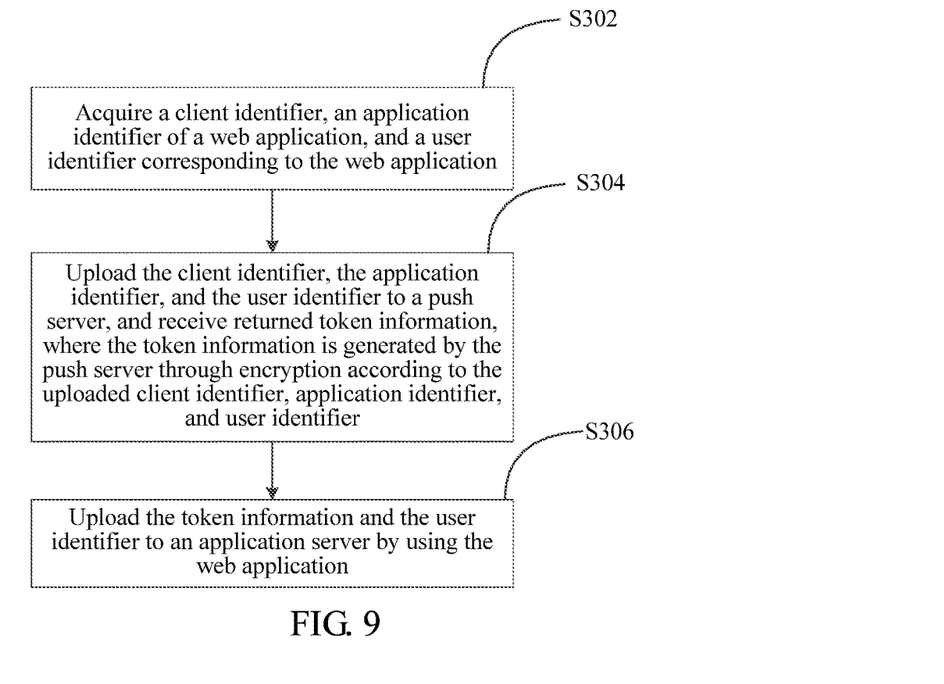
FIG. 9 is a flowchart of a method for generating token information of a web application in an embodiment.

In an embodiment, as shown in FIG. 9, a method for generating token information of a web application is provided, and the method completely relies on a computer program, and may run in a computer system based on the von Neumann architecture. The method includes:

Step S302: Acquire a client identifier, an application identifier of a web application, and a user identifier corresponding to the web application.

Step S304: Upload the client identifier, the application identifier, and the user identifier to a push server, and receive returned token information, where the token information is generated by the push server through encryption according to the uploaded client identifier, application identifier, and user identifier.

Step S306: Upload the token information and the user identifier to an application server by using the web application.

In this embodiment, the step of the acquiring a client identifier, an application identifier of a web application, and a user identifier corresponding to the web application is:

acquiring a user identifier entry event of the web application, acquiring a user identifier corresponding to the user identifier entry event, and acquiring the client identifier and the application identifier of the web application by using a browser background process.

In this embodiment, the step of the uploading the client identifier, the application identifier, and the user identifier to a push server includes:

uploading the client identifier, the application identifier, and the user identifier to the push server by calling an interface function of a browser background process.

In this embodiment, the step of the receiving returned token information includes:

receiving the returned token information by using the browser background process, and using the token information as a callback value of the interface function and returning the callback value to the web application.

Figure 10:
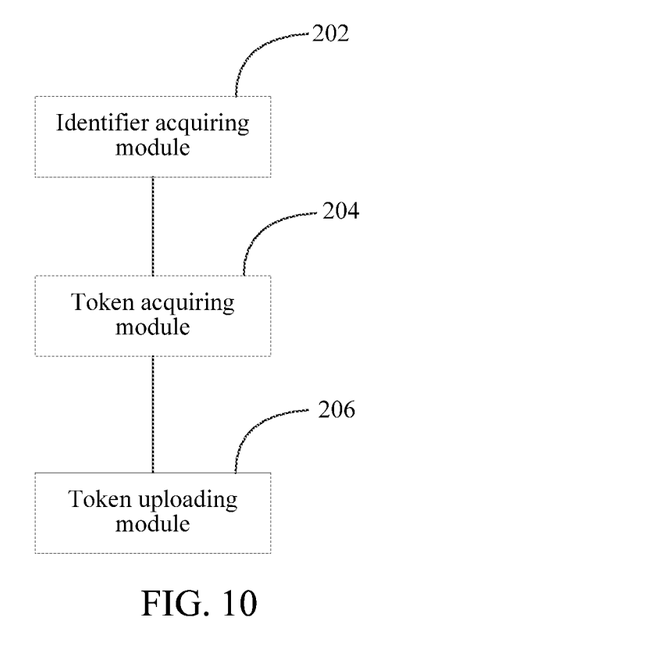
FIG. 10 is a schematic structural diagram of an apparatus for generating token information of a web application in an embodiment.

In an embodiment, as shown in FIG. 10, an apparatus for generating token information of a web application includes:

an identifier acquiring module 202, configured to acquire a client identifier, an application identifier of a web application, and a user identifier corresponding to the web application;

a token acquiring module 204, configured to upload the client identifier, the application identifier, and the user identifier to a push server, and receive returned token information, where the token information is generated by the push server through encryption according to the uploaded client identifier, application identifier, and user identifier; and a token uploading module 206, configured to upload the token information and the user identifier to an application server by using the web application.

In this embodiment, the identifier acquiring module 202 is further configured to acquire a user identifier entry event of the web application, acquire a user identifier corresponding to the user identifier entry event, and acquire the client identifier and the application identifier of the web application by using a browser background process.

In this embodiment, the token uploading module 206 is further configured to upload the client identifier, the application identifier, and the user identifier to the push server by calling an interface function of a browser background process.

In this embodiment, the token uploading module 204 is further configured to receive the returned token information by using the browser background process, and use the returned token information as a callback value of the interface function and return the callback value to the web application.

In the foregoing method and system for pushing a web application message, method and apparatus for pushing message information of a web application to a browser, and method and apparatus for generating token information of a web application, an application server of a web application only needs to send message information and token information to a push server to push the message information, through the push server, to a client corresponding to the token information, so that developers of the web application only need to implement a simple message sending function to complete pushing of the message information, thereby improving the development efficiency.

A person of ordinary skill in the art may understand that all or some of the processes of the foregoing embodiments may be implemented by a computer program instructing relevant hardware. The program may be stored in a computer readable storage medium. When the program is executed, the program may include processes as those in the foregoing method embodiments. The storage medium may be a magnetic disk, an optical disc, a read-only store memory (Read-Only Memory, ROM), a random access memory (Random Access Memory, RAM), or the like.

The foregoing embodiments merely show several implementation manners of the present disclosure with specific and detailed description, but cannot be therefore understood as a limitation to the patent scope of the present disclosure. It should be pointed out that, for a person of ordinary skill in the art, several variations and improvements may be made without departing from the idea of the disclosure invention are fall within the protection scope of the present disclosure. Therefore, the protection scope of the patent of the present disclosure shall be subject to the claims.

What is claimed is:

1. A method for pushing a web application message, comprising:

receiving, by a push server, token information and message information sent by an application server, parsing the token information to obtain a client identifier and an application identifier, acquiring a corresponding client according to the client identifier, and pushing the message information and the application identifier to the client; and acquiring, by the client, a corresponding web application according to the application identifier, and displaying the message information according to the web application;

wherein before the step of the receiving, by the push server, token information and message information sent by an application server, further comprises:

acquiring, by the client, a user identifier entry event of the web application, acquiring a user identifier corresponding to the user identifier entry event transmitting the user identifier and an address of the web application to a interface function of a browser background process; acquiring the client identifier and the application identifier of the web application by using the browser background process under the condition that the interface function is called;

uploading, by the client, the client identifier, the application identifier, and the user identifier to the push server, receiving returned token information, and uploading the token information and the user identifier to the application server by using the web application, wherein the returned token information is generated by the push server through encryption according to the uploaded client identifier, application identifier, and user identifier;

wherein before the step of the pushing, by the push server, the message information and the application identifier to the client, the method further comprises:

acquiring, by the push server, a type value contained in the message information, and determining whether the type value is legal, and if yes, pushing the message information and the application identifier to the client, wherein the type value contained in the message information includes a taskbar message, a pop-up message and a dock.

2. A method for pushing message information of a web application to a browser, comprising:

receiving token information and message information sent by an application server;

parsing the token information to obtain a client identifier and an application identifier;

acquiring a corresponding client according to the client identifier; and pushing the message information and the application identifier to the client;

wherein before the step of the pushing the message information and the application identifier to the client, the method further comprises:

acquiring, by the push server, a type value contained in the message information, and determining whether the type value is legal, and if yes, pushing the message information and the application identifier to the client, wherein the type value contained in the message information includes a taskbar message, a pop-up message and a dock.

3. The method for pushing message information of a web application to a browser according to claim 2, wherein the step of the pushing the message information and the application identifier to the client comprises:

pushing the message information and the application identifier to the client by using a browser long connection.

4. The method for pushing message information of a web application to a browser according to claim 3, wherein the step of the acquiring a corresponding client according to the client identifier further comprises:
    acquiring an online state corresponding to the client identifier, and determining, according to the online state, whether the client is online, and if yes, pushing the message information and the application identifier to the client.

5. The method for pushing message information of a web application to a browser according to claim 4, wherein the step of the acquiring an online state corresponding to the client identifier is:
    acquiring a connection state of a browser long connection to the client as the online state.

6. The method for pushing message information of a web application to a browser according to claim 4, after the step of the determining whether the client is online, further comprising:
    if the client is not online, storing the message information and the token information into a cache, wherein
    the method further comprises:
    receiving a long connection request, establishing a browser long connection to a client corresponding to the long connection request, and receiving an uploaded user identifier by using the browser long connection; and
    acquiring, from the cache, token information corresponding to the user identifier, acquiring message information corresponding to the token information, and pushing the message information to the client.

7. The method for pushing message information of a web application to a browser according to claim 2, wherein the step of the parsing the token information further comprises:
    parsing the token information to obtain a user identifier, and determining, by checking the user identifier, whether the token information is valid, and if yes, acquiring a corresponding client according to the client identifier.

8. An apparatus for pushing message information of a web application to a browser, comprising:
    one or more processors;
    a memory;
    and one or more program modules stored in the memory and executed by the one or more processors, the one or more program modules comprising:
    a message receiving module, configured to receive token information and message information sent by an application server;
    a client acquiring module, configured to parse the token information to obtain a client identifier and an application identifier, and acquire a corresponding client according to the client identifier; and
    a message pushing module, configured to push the message information and the application identifier to the client;
    wherein the client acquiring module is further configured to acquire a type value contained in the message information, and determine whether the type value is legal, and if yes, push the message information and the application identifier to the client, wherein the type value contained in the message information includes a taskbar message, a pop-up message and a dock.

9. The apparatus for pushing message information of a web application to a browser according to claim 8, wherein the message pushing module is further configured to push the message information and the application identifier to the client by using a browser long connection.

10. The apparatus for pushing message information of a web application to a browser according to claim 9, wherein the client acquiring module is further configured to acquire an online state corresponding to the client identifier, and determine, according to the online state, whether the client is online, and if yes, call the message pushing module to push the message information and the application identifier to the client.

11. The apparatus for pushing message information of a web application to a browser according to claim 10, wherein the client acquiring module is further configured to acquire a connection state of a browser long connection to the client as the online state.

12. The apparatus for pushing message information of a web application to a browser according to claim 10, wherein the client acquiring module is further configured to: when the client is not online, store the message information and the token information into a cache, wherein
    the apparatus further comprises a long connection managing module, configured to receive a long connection request, establish a browser long connection to a client corresponding to the long connection request, and receive an uploaded user identifier by using the browser long connection; and
    the message pushing module is further configured to acquire, from the cache, token information corresponding to the user identifier, message information corresponding to the token information, and push the message information to the client.

13. The apparatus for pushing message information of a web application to a browser according to claim 8, wherein the client acquiring module is further configured to parse the token information obtain a user identifier, and determine, by checking the user identifier, whether the token information is valid, and if yes, acquire a corresponding client according to the client identifier.

14. A method for generating token information of a web application, comprising:
    acquiring a client identifier, an application identifier of a web application, and a user identifier corresponding to the web application;
    uploading the client identifier, the application identifier, and the user identifier to the push server, and receiving returned token information, wherein the token information is generated by the push server through encryption according to the uploaded client identifier, application identifier, and user identifier; and
    uploading the token information and the user identifier to the application server by using the web application;
    wherein the step of acquiring a client identifier, an application identifier of a web application, and a user identifier corresponding to the web application is:
    acquiring a user identifier entry event of the web application, and acquiring a user identifier corresponding to the user identifier entry event transmitting the user identifier and an address of the web application to a interface function of a browser background process; and acquiring the client identifier and the application identifier of the web application by using the browser background process under the condition that the interface function is called.

15. The method for generating token information of a web application according to claim 14, wherein the step of the uploading the client identifier, the application identifier, and the user identifier to the push server comprises:

uploading the client identifier, the application identifier, and the user identifier to the push server by calling an interface function of a browser background process.

16. The method for generating token information of a web application according to claim 15, wherein the step of the receiving returned token information comprises:

receiving the returned token information by using the browser background process, and using the token information as a callback value of the interface function and returning the callback value to the web application.

17. An apparatus for generating token information of a web application, comprising:

one or more processors;

a memory;

and one or more program modules stored in the memory and executed by the one or more processors, the one or more program modules comprising:

an identifier acquiring module, configured to acquire a client identifier, an application identifier of a web application, and a user identifier corresponding to the web application;

a token acquiring module, configured to upload the client identifier, the application identifier, and the user identifier to the push server, and receive returned token information, wherein the token information is generated by the push server through encryption according to the uploaded client identifier, application identifier, and user identifier; and a token uploading module, configured to upload the token information and the user identifier to the application server by using the web application;

wherein the identifier acquiring module is further configured to acquire a user identifier entry event of the web application, acquire a user identifier corresponding to the user identifier entry event, transmit the user identifier and an address of the web application to a interface function of a browser background process; and acquire the client identifier and the application identifier of the web application by using the browser background process under the condition that the interface function is called.

18. The apparatus for generating token information of a web application according to claim 17, wherein the token uploading module is further configured to upload the client identifier, the application identifier, and the user identifier to the push server by calling an interface function of a browser background process.

19. The apparatus for generating token information of a web application according to claim 18, wherein the token acquiring module is further configured to receive the returned token information by using the browser background process, and use the returned token information as a callback value of the interface function and return the callback value to the web application.

* * * * *